United States Patent [19]

Raymond

[11] 3,786,920

[45] Jan. 22, 1974

[54] FILTER APPARATUS FOR HYDRAULIC SYSTEM

[75] Inventor: Robert E. Raymond, Zanesville, Ohio

[73] Assignee: International Basic Economy Corporation, New York, N.Y.

[22] Filed: June 26, 1972

[21] Appl. No.: 266,417

Related U.S. Application Data

[63] Continuation of Ser. No. 103,176, Dec. 31, 1970, abandoned.

[52] U.S. Cl. .................... 210/90, 210/172, 210/232
[51] Int. Cl. ............................................ B01d 35/14
[58] Field of Search ....... 55/270, 274; 210/90, 108, 210/130, 131, 172, 232, DIG. 14

[56] References Cited
UNITED STATES PATENTS

| | | | |
|---|---|---|---|
| 3,572,508 | 3/1971 | Rice | 210/172 X |
| 2,569,748 | 10/1951 | Grave | 210/108 |
| 3,543,934 | 12/1970 | Raymond | 210/90 |
| 3,468,420 | 9/1969 | Rosaen | 210/90 |

OTHER PUBLICATIONS

Perry's Chemical Engineer's Handbook, "Flow Measurement: Static Pressure," p. 5-5, 4th Edition, 1963.

"Sampling Particulate Matter," R. L. Solnick, The Oil and Gas Journal, 10-15-56, pages 120-124.

Primary Examiner—Samih N. Zaharna
Assistant Examiner—Robert H. Spitzer
Attorney, Agent, or Firm—Palmer Fultz

[57] ABSTRACT

A filter for a hydraulic system which filter is mounted within the reservoir containing the hydraulic fluid supply. The filter comprises a yieldably mounted cylinder element that is normally biased towards a closed filtering position, said filter element being adapted to yield to an open position at such times as porous side walls of the filter element become clogged to the extent that a predetermined back pressure is imposed by the filter element on the flow passing therethrough. The apparatus is further characterized by a filter condition sensing and indicating means that senses only that pressure build-up within the filter element which is caused by clogging of the porous walls of the element. Hence, false condition indications due to flow surges inherent in filtered systems are eliminated.

2 Claims, 7 Drawing Figures

FILTER APPARATUS FOR HYDRAULIC SYSTEM

CROSS REFERENCE TO RELATED APPLICATION

This application is a continuation in part of my copending application Ser. No. 103,176 filed Dec. 31, 1970 now abandoned.

BACKGROUND OF THE INVENTION

Field of the Invention

This invention relates generally to filters for hydraulic systems and more particularly to such a device that is mounted within the reservoir of a hydraulic system.

In general, the filter apparatus of the present invention comprises an assembly that is mounted within the reservoir of a hydraulic system which reservoir supplies the fluid that is circulated through the pump, motor and other hydraulic components of the system. Such filter apparatus comprises generally a filter element mounting means, disposed within the bath of hydraulic fluid in the reservoir, and a cylindrical filter element of conventional design known to the art and slideably mounted on said mounting means. The filter element is normally biased toward a closed filtering position wherein the hydraulic fluid being circulated must pass through the porous side walls of the cylindrical filter element.

The above mentioned mounting means is adapted to permit yielding of the filter element to an open position at such time as the porous side walls of the filter element become clogged to the extent that a predetermined back pressure is imposed by the filter element on the flow passing therethrough.

As a result of such yieldable characteristics of the filter element, it will be understood that the filter element and its mounting means are adapted to provide a by-pass relief valve action which permits the hydraulic system to continue to operate even after the filter is clogged with filter's contaminates.

SUMMARY OF THE INVENTION

Filter condition indicating means for the above described type of apparatus, as well as for other by-pass filter arrangements, inherently impose a problem in that flow surges inherent in systems being filtered produce false read-outs with respect to the condition of the filter element. That is to say a flow build-up in a system causes the condition indicator to show clogging when such has not as yet occured.

As a primary aspect of the present invention the filter apparatus is provided with a novel filter condition sensing and indicating means that senses only that pressure build-up within the filter element which is caused by clogging of the porous walls of the element. That is to say, the sensing and indicating means of the present invention is isolated from flow surges which inherently occur in hydraulic systems being filtered whereby only the extent of clogging of the filter element is indicated.

As another aspect of the present invention, the above mentioned filter apparatus and mounting means are disposed within the reservoir bath without the need of a filter housing around the filter element and without the need for external piping exterior of the reservoir. As a result, lower cost and space economy are realized.

As another aspect of the present invention, the filter element of the present apparatus is removable, replacable or cleanable, without disturbing any other components of the hydraulic system and without the need for shutting down the operation thereof.

As another aspect of the present invention, the filter apparatus is uniquely adapted for suction, by-pass or return line filtering with many additional circuit options all of which are accomplished within the reservoir.

As another aspect of the present invention, the filter apparatus can easily be provided with contamination indicator gauges of a standard type, either at the filter or at remote locations.

As still another aspect of the present invention, the filter apparatus, being disposed within the reservoir bath without the need of a filter housing immediately surrounding the filter element, functions as a diffuser for the fluid flow since the fluid is either picked up by or discharged from the filter media through a relatively large porous area provided by the cylindrical wall of the filter element.

As another aspect of the present invention, the novel filter apparatus and mounting means are mounted within the reservoir by a novel assembly which provides a flow conduit for the flow of hydraulic fluid, to or from the filter element, as well as a pressure gauge and mounting conduit for such gauge, with said assembly being removable as a unit from an opening in the top of the reservoir.

It is a primary object of the present invention to provide an improved filter apparatus and filter condition indicating means that eliminates false filter condition read-outs from the occurrence of pressure surges in the hydraulic system being filtered.

It is another object of the present invention to provide a novel filter apparatus uniquely adapted to provide by-pass relief valve action for the relief of surge flows or saturated contamination conditions.

It is another object of the present invention to provide a novel filter apparatus wherein the filter element is mounted directly within the hydraulic fluid bath of the reservoir without the need for a filter housing or external piping.

It is another object of the present invention to provide a novel filter apparatus which can easily be selectively arranged for by-pass or return line filtering operation.

It is another object of the present invention to provide a novel filter apparatus wherein the filter element is removable, cleanable and replaceable without disturbing any other components of the hydraulic system and without the need for shutting down operation thereof.

It is another object of the present invention to provide a novel filter apparatus which can be provided with contamination indicator means of standard pressure gauges mounted either at the filter location or remote therefrom.

It is still another object of the present invention to provide a novel filter apparatus which includes the above-mentioned features in combination with a novel mounting and conduit assembly which assembly can be removed as a unit from an access hole in the top of the reservoir.

It is still another object of the present invention to provide a novel filter apparatus wherein a plurality of filter elements can be stacked in series so as to provide additional area of filter media using standard cylindrical filter cartridge elements.

Further features and the advantages of the present invention will be apparent from the following description, reference being had to the accompanying drawings wherein a preferred form of embodiment of the invention is clearly shown.

DESCRIPTION OF THE PREFERRED EMBODIMENT

Figure 1:
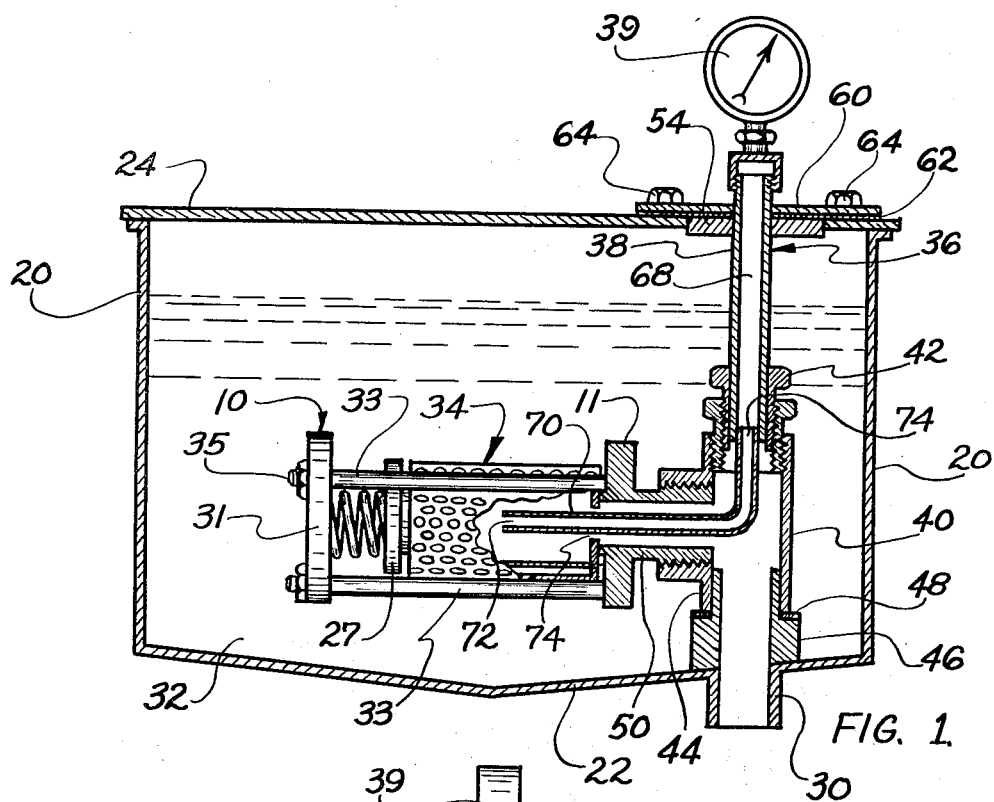
FIG. 1 is a side sectional view of a hydraulic reservoir showing the filter apparatus of the present invention mounted therein.
Figure 2:
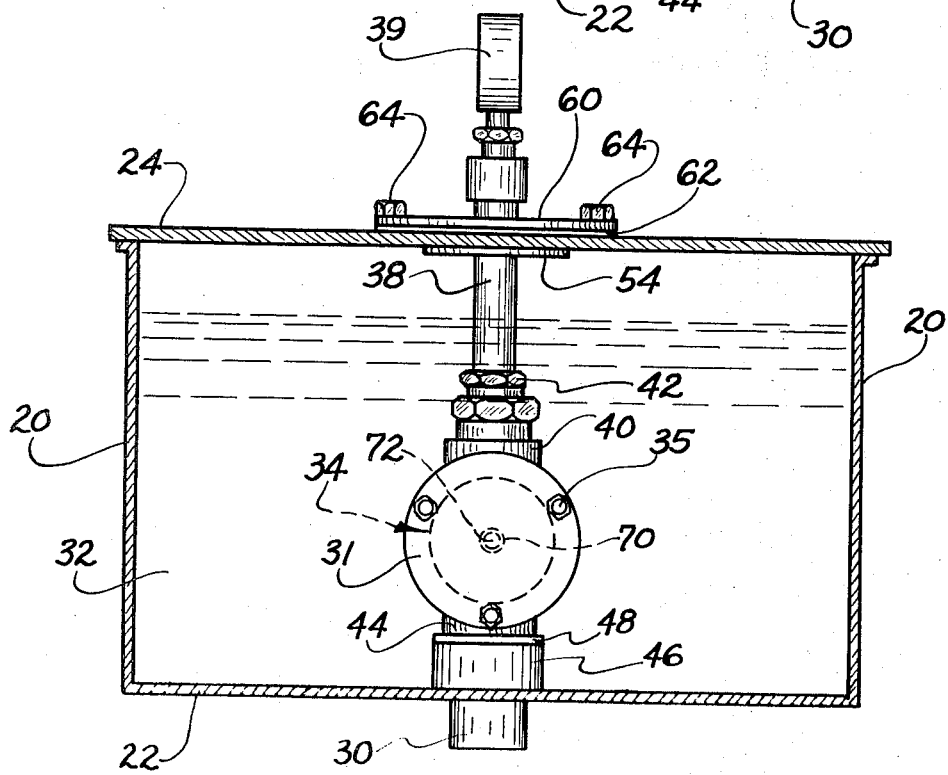
FIG. 2 is an end sectional view of the reservoir and filter apparatus of FIG. 1.

Referring in detail to the drawings, FIGS. 1 and 2 illustrate a reservoir for a hydraulic machine or system which includes side walls 20, a bottom wall 22 and a top wall 24 provided with an access opening 26. As seen in FIG. 1, bottom wall 22 of the reservoir includes a port 30 for the flow of hydraulic fluid through the reservoir which port may be connected with the discharge of a hydraulic pump, valves or other system components, not illustrated, whereby fluid from a bath 32 of hydraulic fluid passes through a cylindrical filter element indicated generally at 34.

In the preferred embodiment shown, the port 50 is connected to the discharge or pressure side of the pump.

With continued reference to FIGS. 1 and 2, the apparatus further includes a filter condition indicator assembly indicated generally at 36 which includes a tube portion 38 on the upper end of which is mounted pressure indicating indicia such as a gauge 39. The lower end of tube portion 38 is connected to a housing portion 40 at a coupling 42, and the lower end of said housing portion 40 includes an annular mounting shoulder 44 which confronts a second annular mounting shoulder 46 carried by lower reservoir wall 22 and in surrounding relationship with port 30.

A resilient seal or gasket 48 is disposed between shoulder 44 on housing 40 and the confronting shoulder 46 carried by bottom reservoir wall 22.

With continued reference to FIGS. 1 and 2, housing 40 includes a horizontally extending conduit 50 on the end of which is mounted a filter element mounting means indicated generally at 10.

As is best seen in FIG. 2, tube portion 38 of the filter and condition indicator assembly carries an axially adjustable collar 54 provided with a set screw. Such collar can be selectively released for axial movement and reclamped, by loosening and tightening the set screw, so that collar 54 can be positioned at various axial locations along tube portion 38. This adapts the assembly for use with reservoirs of various depths.

Details of the construction of filter condition indicator assembly 36 are illustrated and described in detail in my United States Letters Patent No. 3,543,934 issued Dec. 1, 1970.

With continued reference to FIGS. 1 and 2, a clamp plate 60 and an air seal gasket 62 are disposed in overlying relationship with collar 54 such that when a plurality of bolts 64 are tightened, clamp plate 60 urges air seal gasket 62 into sealed engagement with top wall 24 of the reservoir and also in sealed engagement with axially adjustable collar 54.

It is important to note that the tightening of bolts 64 also serves to apply axial force to collar 54 which in turn forces tube 38 downwardly hence urging shoulder 44 on the lower end of housing 40 into sealed engagement with an oil seal gasket 48 and the underlying shoulder 46 which surrounds port 30.

In view of the above it will be noted that the tube portion 38 of the filter assembly serves the dual function of providing a passage 68 for transmitting pressure to gauge 39 and forming a structural member for urging lower shoulder 44 into sealed engagement with underlying resilient oil seal 48.

In operation, when it is desired to remove the filter condition indicator assembly 36, for example when filter element 34 becomes partially clogged as indicated by gauge 39, then the bolts 64 are removed and the filter assembly 36 together with clamp plate 60 and gasket 62, is lifted upwardly and outwardly through access opening 26, it being understood that the tubular portion 38 must be tilted from the vertical so as to permit removal of the L-shaped assembly, including the filter mounting means 10, whereby the filter or any portion of the assemnly can be serviced.

Figure 3:
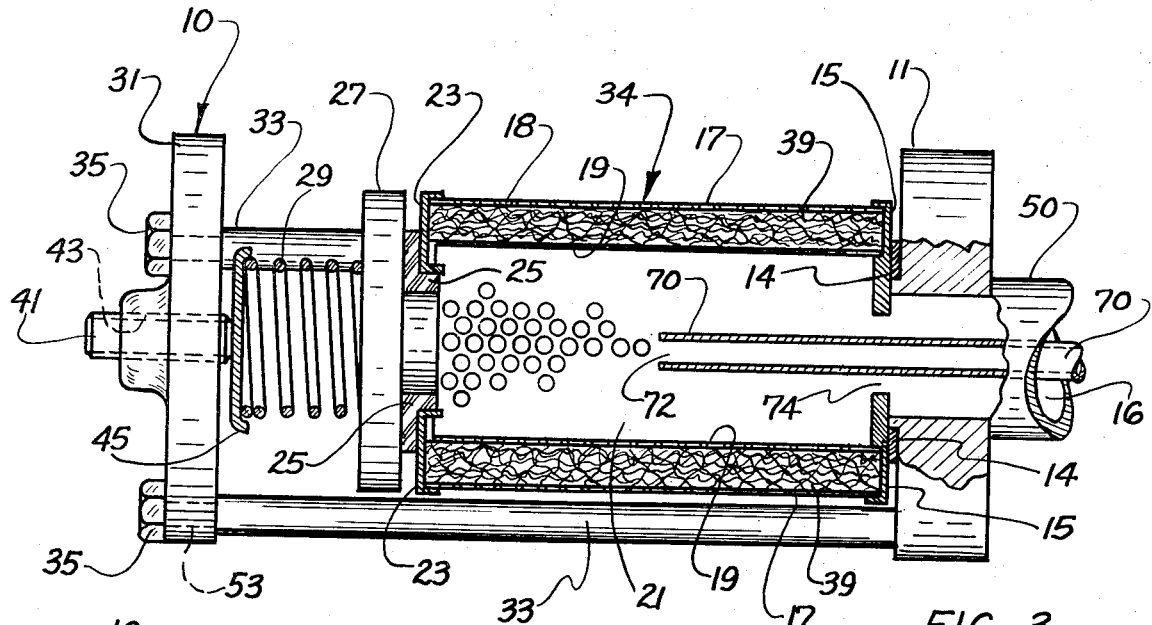
FIG. 3 is a side elevational view, partially in section, of a filter apparatus constructed in accordance with the present invention.
Figure 4:
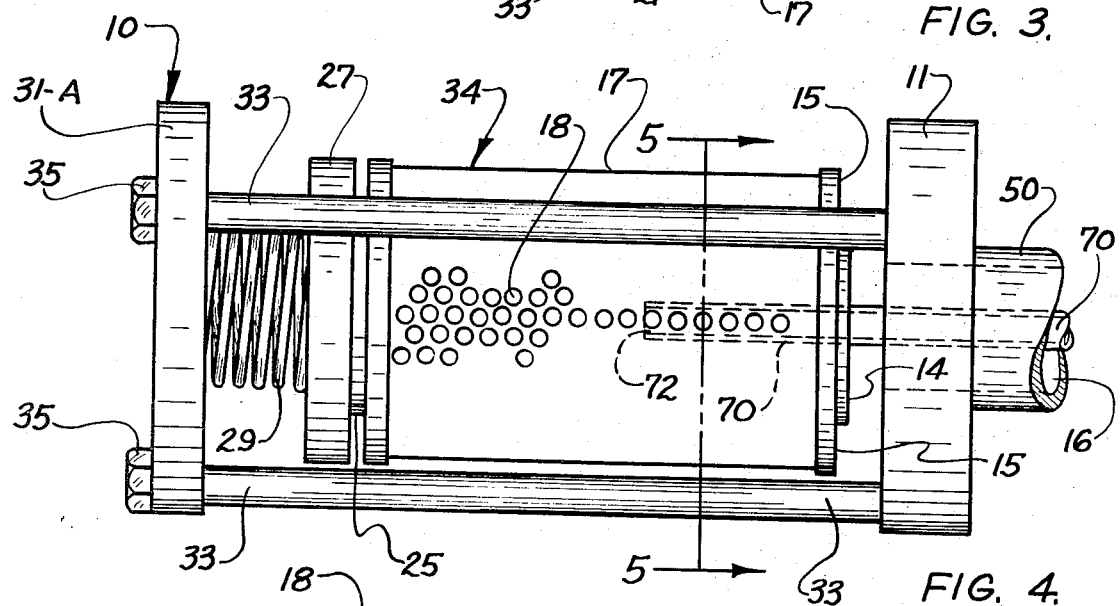
FIG. 4 is a side elevational view of a modified filter apparatus construction in accordance with the present invention.
Figure 5:
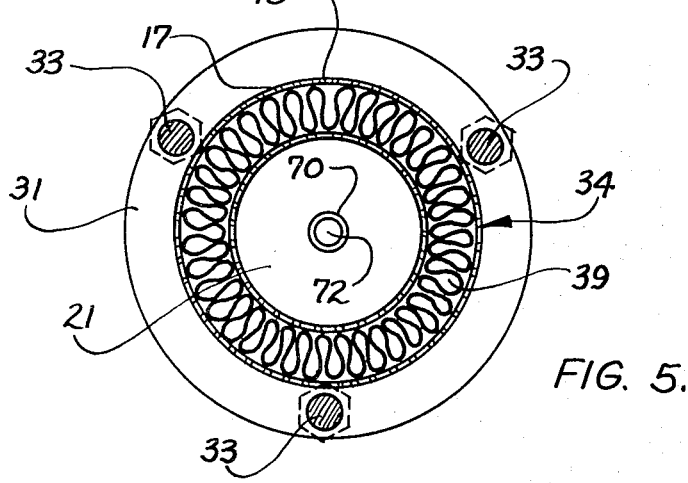
FIG. 5 is an end sectional view of the apparatus of FIG. 4, the section being taken along the lines 5—5 of FIG. 4.

Referring next to FIGS. 3 - 5, a filter element mounting means is indicated generally at 10 and includes a first end wall 11 mounted on conduit 50, assembly 36, and a second end wall, with said end walls being connected together by three guide rods 33. As seen in FIG. 3, the right end of the guide rod is mounted in threaded holes 51 in right end wall 11 and the left end of guide rods 33 are threaded at 53 and provided with nuts 35 whereby the left end 31 can readily be removed providing access to a filter element 34 for the removal, cleaning and replacement thereof.

With continued reference to FIGS. 3 - 5, a filter element 34 is in the form of a conventional cylindrical filter element, well known to the art, which includes inner and outer cylindrical side walls 18 and 19 formed of perforated paper, metal or the like, and a filter media 39 is disposed between such side walls 18 and 19 and may be in the corrugated configuration shown in FIG. 5.

Filter element 34 further includes an annular shoulder 15 that surrounds a filter inlet orifice 74 with said annular shoulder being provided with an annular resilient seal portion 14 which normally engages a second seal portion formed by the peripheral surface of end wall 11 that surrounds a mounting means port 13 communicating with the passage 16 within conduit 50, it being understood that passage 16 communicates with port 30, FIGS. 1 and 2, via the interior of housing 40 of apparatus 36.

Referring again to filter element 34, the left end thereof includes an annular shoulder 23 which engages a resilient seal 25 of L-shaped cross-sectional configuration which is in turn mounted on a protrusion on an end closure element 27.

As seen in FIG. 3, a resilient element or compression spring 29 is disposed between end closure 27 and a spring mount 45, the latter including a threaded element 41 mounted in a bore 43 in second end wall 31 such that rotation of threaded portion 41 adjusts the preload on spring 29. This permits adjustment of the predetermined pressure at which filter element 34 will yield to the left, as viewed in FIG. 3, and move from the closed position of FIG. 3 to the open or by-pass relief position of FIG. 4.

FIG. 4 illustrates a modified embodiment which is identical to the embodiment of FIG. 3 except that the variable bias adjusting means 41 – 45 is eliminated such that the embodiment of FIG. 4 will always effect by-pass relief at the same selected pressure setting for spring 29.

In operation, when the port 30 is connected to the discharge side of a pump, not illustrated, the flow of hydraulic fluid enters port 30, passes through housing 40, conduit 50 and then into the cylindrical hollow portion 21 of filter element 34. The fluid is thereafter filtered and diffused as it passes outwardly through the outer and inner walls 18 and 19 and the filter media 39. As the system continues to operate and contaminates are collected in the filter media 39, the resistance to flow will as a result increase and when a predetermined back pressure exerted by the filter media is reached at which pressure the force exerted by the filter media is reached at which pressure the force exerted by spring 29 is exceeded, then filter element 34 will shift to the left from the closed position of FIG. 3 to the open position of FIG. 4 whereby fluid from conduit 50 will be released directly from the mounting means port 13 to the bath 32 of the reservoir.

It will be understood that the system will continue to operate although the flow will no longer be filtered.

It should be mentioned that since the opening or by-pass relief occurs at the right end of filter element 34, the release of fluid directly to the reservoir will be upstream of the collected contaminates within the filter media 39, such that such contaminates will be retained in the filter media rather than being released to the reservoir bath.

With reference to FIG. 3, it should be mentioned that the net internal area at the right end with is exposed to the pressure within the hollow portion 21 of the filter is greater than the corresponding internal area at the left end whereby the separating force will always be such as to cause filter element 34 to shift to the left, as seen in FIG. 4, thereby releasing the unfiltered flow directly to the bath upstream of the filter element 34.

Reference is next made to the filter condition indicating apparatus of the present invention which comprises a pressure detector tube 70 which connects the cavity 21 in filter element 34 with tube passage 68 leading to a filter condition indicator such as pressure gauge 39 shown in FIGS. 1 and 2.

Detector tube 70 cooperates with a filter inlet orifice 74 to isolate gauge 39 from reading pressure rises which occur in the hydraulic system thereby eliminating false read-outs at gauge 39. More particularly, upon occurrence of a flow surge in return line 30, FIGS. 1 and 2, filter inlet orifice 74 will reject surge imposed pressure rises from occurring in filter cavity 21. Hence a detector tube inner port 72 can only detect pressure rises within filter cavity 21 which are the result of clogging of porous side wall 29 by filtered contaminants.

Figure 6:
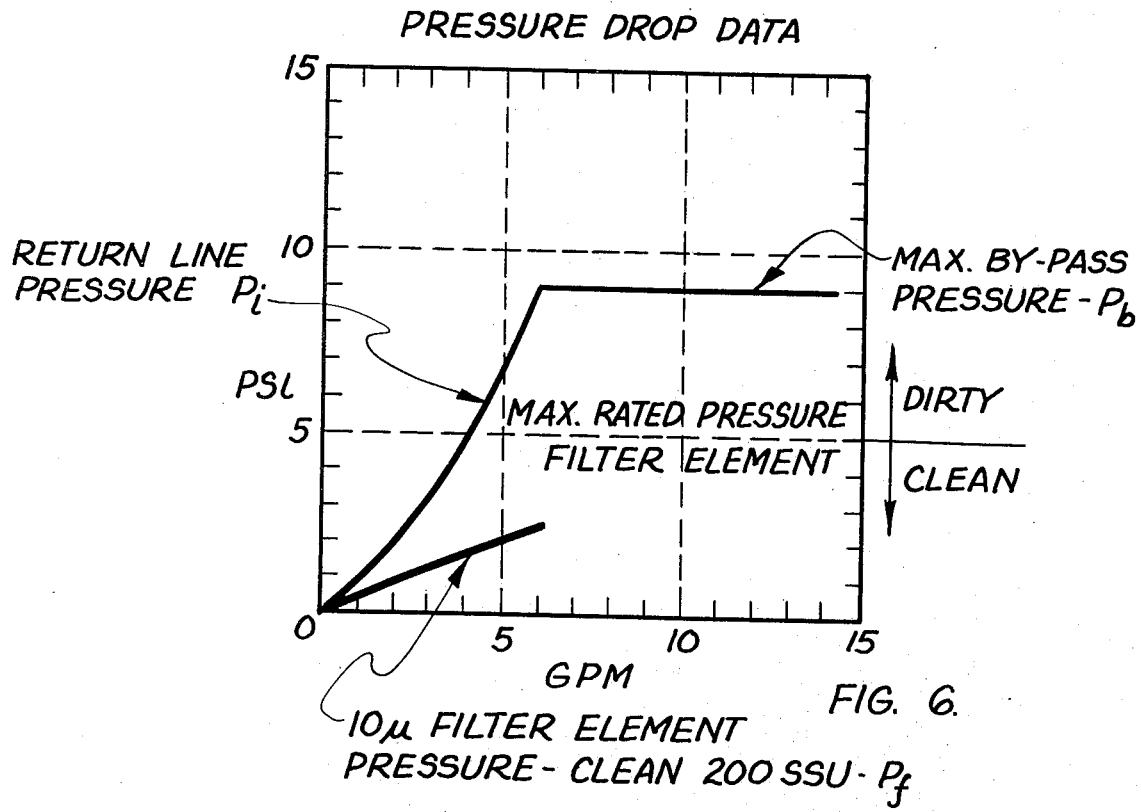
FIG. 6 is a graphical illustration showing pressure drop data for the operation of the apparatus of the present invention.
Figure 7:
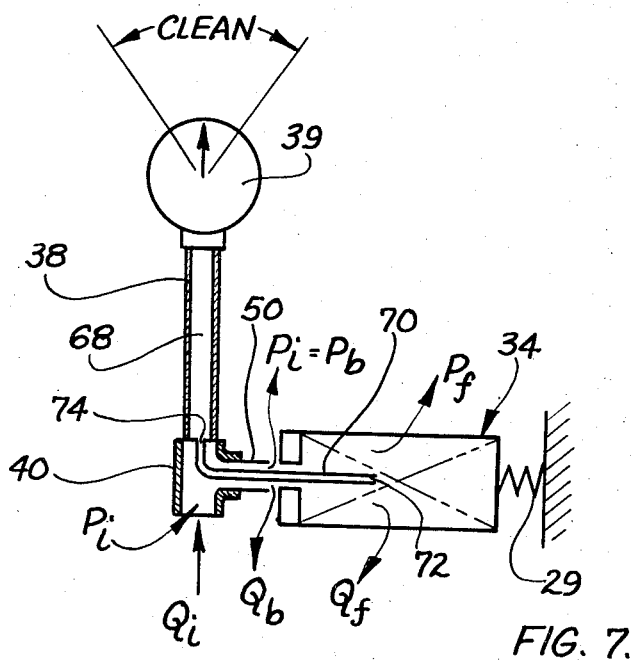
FIG. 7 is a diagrammatic view of filter and filter condition indicating apparatus of the present invention.

Operation of the above described filter condition indicating apparatus is illustrated diagrammatically in FIG. 7 and graphically in FIG. 6 from which it will be seen that if the return line pressure $P_t$ rises to a preselected maximum by-pass pressure $P_b$ the filter cartridge 34 shifts to the left, from the position of FIG. 3 to the position of FIG. 4 whereby by-pass flow $Q_b$ is released directly to reservoir bath 32. At the same time, due to the location of detector tube inner port 72, and the flow rejection characteristic of inlet orifice 74 the pressure in detector tube 70 and tube passage 68 is only that pressure within filter cavity 21 which is a function of the degree of clogging of the filter element.

The graph of FIG. 6 shows a typical example of a 10 micron filter element using 200 SSU fluid viscosity, which is acceptably clean to an internal filter pressure $P_f$ of 5 psi with a maximum rated filter flow $Q_f$ of 6 gallons per minute and a maximum rated system flow $Q_b$ at by-pass of 85 gallons per minute.

While the form of embodiment herein shown and described, constitutes preferred form, it is to be understood that other forms may be adopted falling within the scope of the claims that follow:

What is claimed is:

1. A reservoir and filter apparatus comprising, in combination, reservoir means for containing a bath of fluid to be filtered and including a reservoir wall provided with a filter access port; a filter and filter condition indicating apparatus mounted on said reservoir wall and extended through said filter access port and into said bath, said apparatus being removable from said reservoir means as an assembly and comprising (a) a hollow filter element comprising a porous filter wall and a filter cavity provided with a filter inlet orifice; (b) by-pass means for by-passing hydraulic fluid past said filter inlet orifice upon clogging of said porous wall; (c) a pressure detector tube including an inner detector tube port disposed in said filter cavity and an outer detector tube port; (d) and a filter condition indicator connected to said outer detector tube port.

2. The reservoir and filter apparatus of claim 1 wherein said reservoir means includes a second reservoir wall provided with a reservoir port for the flow of fluid through the reservoir means and a first mounting shoulder for said filter and filter condition indicating apparatus; and wherein said filter and filter condition indicating apparatus includes a housing portion provided with a housing port communicating with said reservoir port and a second mounting shoulder removably connected to said first mentioned mounting shoulder.

* * * * *